Jan. 22, 1963  O. BRAUN ETAL  3,074,632
ELECTRONIC CONTROL SYSTEM FOR SEWING MACHINES AND THE LIKE
Filed Sept. 11, 1959  5 Sheets-Sheet 1

Fig. 1a

INVENTORS
OSKAR BRAUN & KARL WINZ
BY
ATTORNEY

Fig.1c.

United States Patent Office 3,074,632
Patented Jan. 22, 1963

3,074,632
ELECTRONIC CONTROL SYSTEM FOR SEWING MACHINES AND THE LIKE
Oskar Braun and Karl Winz, Kaiserslautern, Pfalz, Germany, assignors to G. M. Pfaff AG, Kaiserslautern, Pfalz, Germany, a corporation of Germany
Filed Sept. 11, 1959, Ser. No. 839,422
Claims priority, application Germany Sept. 12, 1958
8 Claims. (Cl. 235—132)

The present invention relates to improvements in electronic control systems for sewing and the like machines for the automatic performance of a complete operating programme which may comprise a number of separate or overlapping sequential and preferably preselectable partial controls of operations to be performed during a given operating period or cycle of the machine.

More particularly, the invention is concerned with electronic digital control systems of this type based on the subdivision of the operating programme or cycle of the machine into elemental units each being represented by an electric counting pulse, say one pulse per each revolution of the machine, said pulses being applied to an electronic counter to effect a control operation upon reaching a predetermined count resulting in an output or order pulse.

Known control systems of this type, such as have been proposed for sewing and the like machines, comprise a pulse generator operated by the machine and producing a consecutive series of counting pulses proportional to the number of revolutions, said pulses being applied to the input of an electronic decade counter. The counter, upon reaching a predetermined count produces a control signal or order pulse initiating the operation of a desired control device of the machine. With arrangements of this type, it is possible, for instance, to control the length of a seam or seams being sewn, to adjust the feed movement of a work carrier or support between sequential operations, or to effect the connection or disconnection of any number of auxiliary devices or control elements within a predetermined operating programme or cycle.

More specifically, with one type of automatic control of this type known in the art, the counter is preset to a predetermined number, whereby, upon reaching the predetermined count or number, an order pulse results initiating the desired control. With arrangements of this type, it is possible to carry out more than one operation only if the starting point and the duration of the operations coincide, that is, for instance, where the same number of stitches are to be sewn, since the counter can produce only a single control pulse at the end of the preset counting operation, whereupon it must be reset for effecting a subsequent control.

In order to enable the carrying out of a plurality of controls by the use of a single counter without resetting after each control operation, it has furthermore been proposed in connection with machine tool controls to utilize a digital-servo feedback loop arrangement, whereby the counting pulses produced by the pulse generator and applied to an electronic counter are impressed upon a network constituting a digital storage or programming device and including coded instructions for the respective controls or operations to be performed. More specifically, the number of the counting pulses produced by the machine are compared with the coded numbers stored in the programming network, in such a manner that, upon coincidence of both numbers, an order pulse is produced to initiate the respective control or operation. In this manner it is possible to control any desired number of devices by means of a single counter during an operating cycle or programme to be performed by a machine. Such arrangements are however highly complex in circuitry as well as bulky and expensive, whereby in practice their use has been justified only in connection with large and high cost machine tool operations.

Accordingly, among the objects of the present invention is the provision of an automatic digital electronic control system suitable specially, though not limitatively, for the multiple operation or control of a sewing machine and which is both simple in design, relatively inexpensive in manufacture, as well as efficient and reliable in operation and which will enable the carrying out of a desired integrated, preferably preselectable operating programme comprising any desired number of simultaneous or sequential partial operations or controls securely and expeditiously and substantially without the requirement of complex electronic circuitry or involving elaborate programming or presetting operations to be supervised by skilled and expert personnel.

A more specific object of the invention is the provision of a digital electronic control system for sewing and the like machines by which a plurality of operations may be controlled by use of a single electronic counter and relatively simple electrical circuitry, that is, without requiring complex comparison circuits, built-in coded instructions, etc., as used by prior art control systems.

The invention, as to its ancillary objects and novel aspects, will be better understood from the following detailed description considered in conjunction with the accompanying drawings wherein.

Like reference characters denote like parts in the different views of the drawings.

With the foregoing objects in view, the invention involves generally the provision of an electric pulse generator adapted to produce a series of electronic counting pulses, each pulse representing a predetermined elemental movement, say one revolution, of the sewing or the like machine to be controlled within a predetermined operating programme or cycle. The counting pulses are applied to an electronic decade counter having a plurality of decade-counting stages each adapted to produce a series of successive "units," "tens," "hundreds," etc., electric counting pulses, respectively. The invention furthermore comprises a plurality of relay devices or switching units each serving to control one of the operating devices or organs of the machine and having "set" and "unset" input circuits, such as in the form of suitable trigger or flip-flop networks, for connecting and disconnecting the respective relays and associated control devices. Each of the "set" and "unset" circuits or electrodes is preceded by a coincidence network or "and" gate or circuit having a number of input or branch circuits corresponding to the number of decade counter stages. Such coincidence or "and" circuits are adapted in a known manner to produce an output signal or control pulse ("set" or "unset" signal for the trigger circuits) only if an input pulse is applied to all the inputs or branches of the circuit. The inputs of the coincidence or "and" circuits are each, in turn, connected to the outputs of the decade stages of the electronic counter, in such a manner as to cause predetermined sets of output ("set" or "unset") signals or pulses to control the respective relays and operating devices upon reaching of definite numbers or counts by said counter during the operating cycle of the machine. It is thus possible, by suitably connecting the inputs of the "and" circuits or gates to predetermined output terminals of the counter decade stages, to effect an automatic connection and disconnection of any desired number of control devices at predetermined instants during the operating cycle of the machines, with all the operations being controlled by a single counter and the operations being preselectable both as to duration and sequence, as may be desired.

According to an improved feature of the invention, there is advantageously provided a distributor or programme selector connected between the outputs of the electronic counter and the inputs of the "and" circuits, to enable a simple and expeditious change from one to another programme, in the manner as will become more apparent from the following description of a complete sewing machine control system constructed in accordance with the principles of the invention.

While the invention will be described in the following with specific reference to the operation and control of a sewing machine, it will be evident that other machines having multiple controls, such as machine tools, may be operated by the same or a similar system, the character of the various controls or operations being immaterial as far as the function of the automatic system of the invention is concerned, as will be further understood as the description thereof proceeds.

Figure 1A:
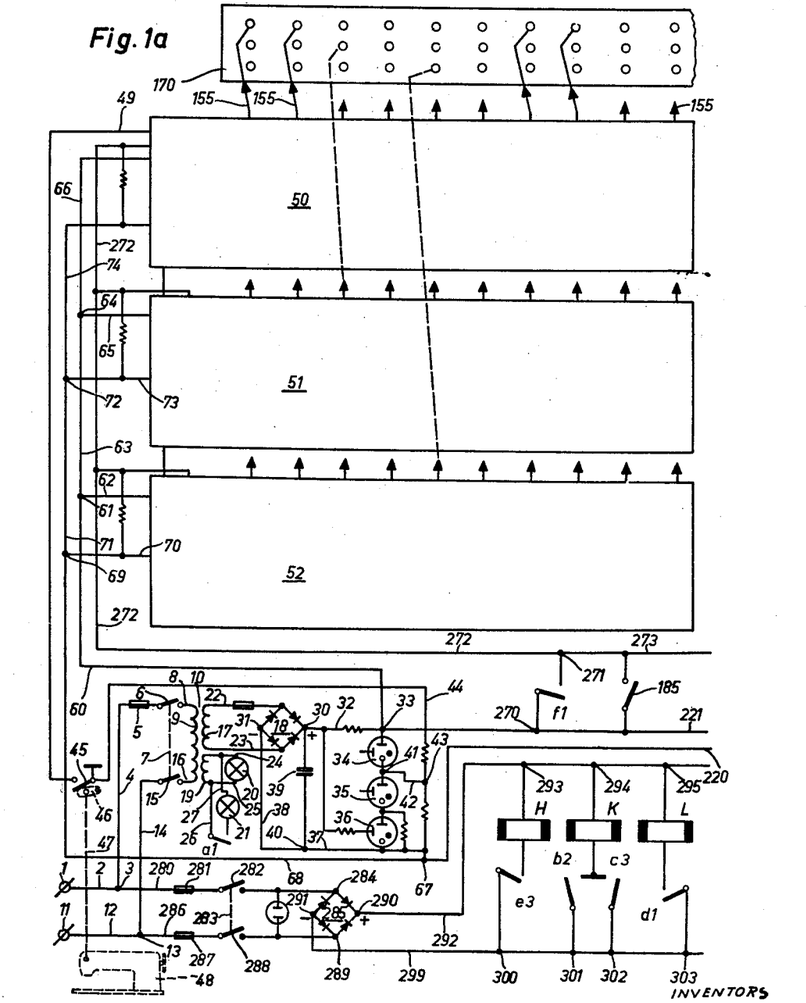
FIGS. 1a and 1b, the latter being the continuation of the former, are a complete wiring diagram of an automatic multiple operation control system for a sewing machine constructed in accordance with the principles of the invention and embodying a three-stage electronic decade counter shown by way of example.
Figure 1B:
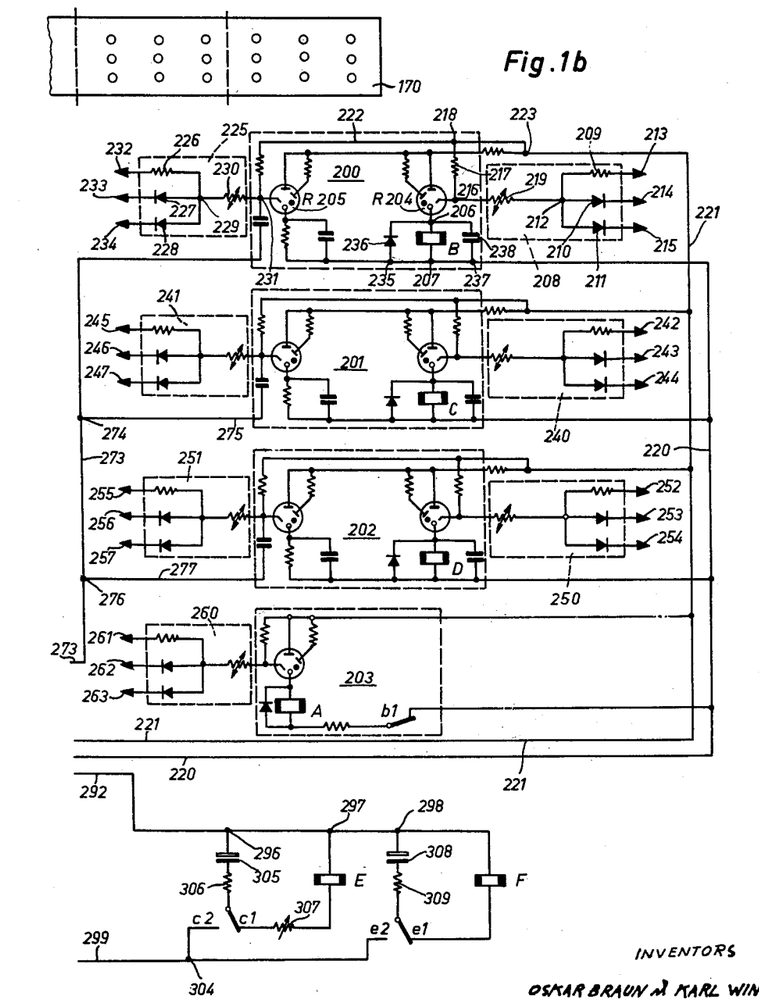
Figure 1C:
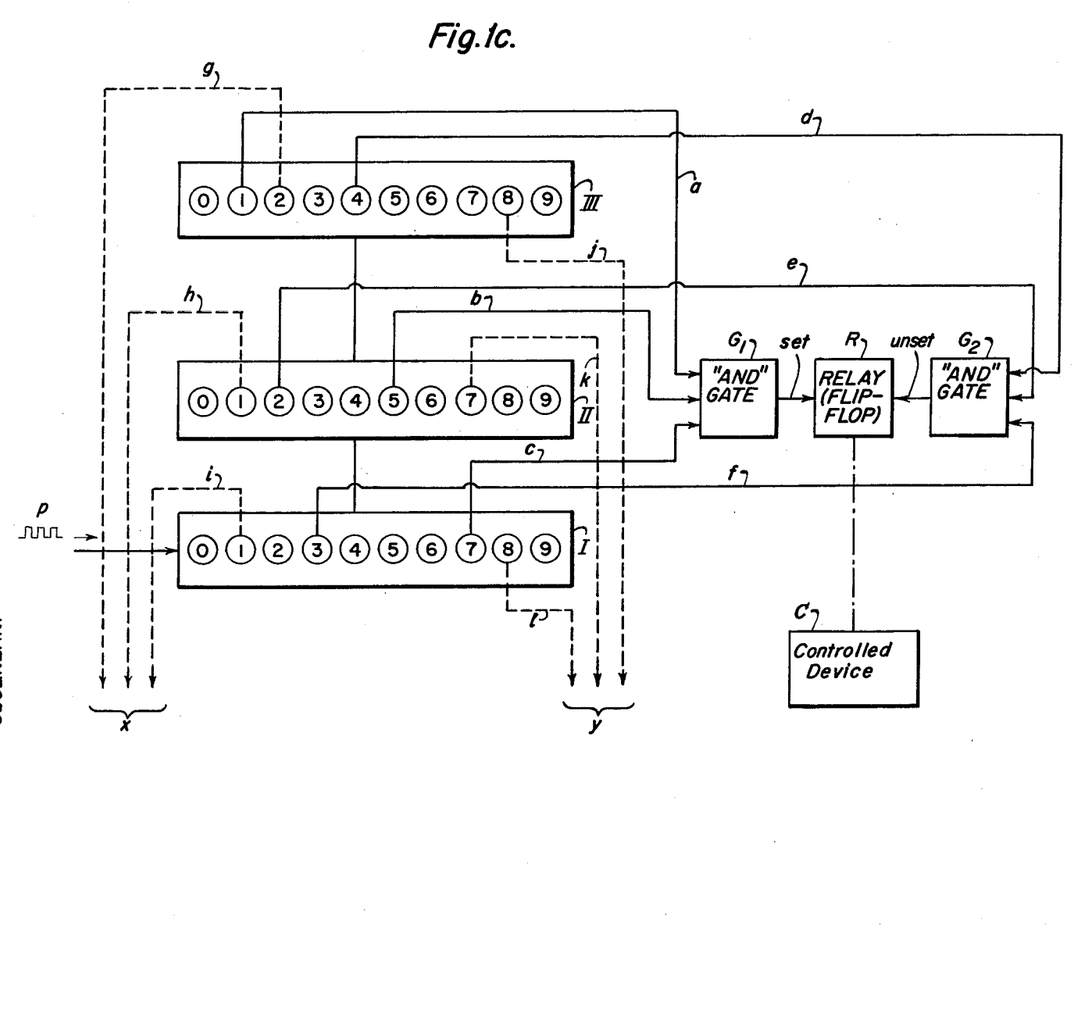
FIG. 1c is a simplified block diagram showing the basic lay-out and construction of the control system according to FIGS. 1a and 1b.

Referring first to FIG. 1c, there is shown a three-stage decade counter comprising a "units" stage I, a "tens" stage II, and a "hundreds" stage III each, in turn, comprising ten counting devices, such as relays, tubes, etc. being numbered 0 to 9 in the drawing and interconnected with each other and the remaining stages in a known manner to be described presently, whereby to progressively energize the devices 0 to 9 by a series of consecutive electric counting pulses $p$ applied to the input of the first or "units" stage I of the counter. Upon reaching the last counting device 9, each decade is reset to start a new counting cycle, while simultaneously applying a "carry" pulse to the next stage, in such a manner that at the occurrence of a definite count or number, say count number 157, within the total operating or counting cycle, that is, 1000 pulses in the case of the three-stage counter shown for illustration, an output signal will be simultaneously available from the respective counting devices, that is, device 1 of the "hundreds" decade III, device 5 of the "tens" decade II, and device 7 of the "units" decade I in the example mentioned and illustrated in the drawing.

The thus obtained predetermined groups of counting pulses derived from the counter are, in turn, applied to the inputs of an "and" gate or coincidence circuit $G_1$ through lines $a$, $b$, $c$, whereby to produce an output of the circuit $G_1$ only upon the occurrence of the respective count number, that is, count 157 according to the example, which output serves to energize the "set" input circuit of a trigger or flip-flop circuit R to, in turn, control the operation or starting of the device C of the sewing or the like machine being controlled. Similarly, in order to stop or interrupt the operation of the controlled device C, a further group of an equal number of signal pulses is derived from the counter at the occurrence of a desired subsequent counting number, say count 423 as illustrated in the drawing, said last group of pulses being applied to the "unset" input circuit of the trigger or flip-flop circuit R by way of a further "and" gate or circuit $G_2$ having its inputs connected through lines $d$, $e$, $f$, to the respective counting devices. In this manner, starting and stopping of the device C or operation thereof within any desired fractional period of the total operating cycle or program of the system may be achieved by the use of a single decade counter, while additional devices may be controlled in the same manner in either progressive or simultaneous relation, such as for instance by additional signals produced at the occurrence of counts 211 and 878 and derived from the counter through lines $g$, $h$, $i$ and $j$, $k$, $l$ respectively. The resulting groups of pulses $x$ and $y$ may, in turn, be applied through "and" gates to trigger circuits for the control of additional devices, in a manner readily understood.

Referring more particularly to the drawings, FIGS. 1a and 1b, the network terminal 1 of a suitable power source, such as a 60 cycle power network, is connected through a lead 2 to a first branch terminal 3 which is in turn connected through a lead 4 and fuse 5 to a first switch arm or movable contact 6 of a double-pole power switch 7.

Switch contact 6 in the closed position is further connected through a lead 8 to one end of the primary winding 9 of a power transformer 10, the opposite terminal 11 of the power source being connected to the remaining end of the winding 9 by way of a lead 12, a second branch terminal 13, a lead 14, the second arm 15 of switch 7 and a lead 16. The transformer has a secondary winding 17 feeding a rectifier 18, shown in the form of a rectifier bridge, and a tertiary winding 19 feeding a pair of signal or indicator lamps 20 and 21.

The rectifier 18 is connected to the secondary winding 17 through a pair of leads 22 and 23. The signal lamp 20 is connected directly to the tertiary winding 19 through a pair of leads 24 and 25, while the lamp 21 is connected to the same winding through a pair of leads 26 and 27 in series with the contact $a1$ of a relay A, to be described in greater detail hereafter. Connected to the output terminals 30 and 31 of the rectifier 18, supplying D.C. operating voltage for the control system with the terminal 30 being of positive and with the terminal 31 of negative polarity as shown, through a lead 32 is a series connection of gaseous voltage stabilizing tubes 34, 35 and 36, the opposite or negative end of which is connected to the negative terminal 31 of the rectifier through a pair of leads 37 and 38. Further connected between the positive terminal 30 and terminal 40 on the lead 37 is a smoothing capacitor 39.

Connected to the junction 41 of stabilizing tubes 34 and 35, which may be in the form of cold cathode gaseous discharge tubes of known design, is a lead 42 ending at a terminal 43 which is connected by way of a lead 44 to the movable contact 45 of a counting pulse generator shown in the form of an interrupter or make-and-break device directly operated by the sewing machine 48, in any suitable manner, as indicated by the broken line 47.

According to a simple embodiment, the interrupter switch 45 may be operated by a cam 46 mounted upon the drive-shaft or connected to any other operating part of the sewing machine, to periodically close an electric circuit and to produce a counting pulse, for instance, during each revolution or for each stitching operation of the machine, in a manner readily understood. In place of a mechanical pulse generator as shown, a known equivalent device may be used to produce counting pulses representing elemental movements of the machine, such as a perforated disc or light chopper and photocell arrangement, a magnetic or electrostatic commutator or pulse generator, or the like interrupting device.

The contact 45 of the pulse generator is connected, in the closed position, through a pulse line 49 to the input of the "units" decade stage 50 of the three-stage electronic counter shown and furthermore comprising a "tens" decade stage 51 and a "hundreds" decade stage 52.

The plus pole of the direct voltage supply is connected through a lead 60 to a terminal 61 which is, in turn, connected through a lead 62 to the "hundreds" decade 52.

Terminal 61 is further connected to a terminal 64 which is, in turn, connected through a lead 65 to the "tens" decade 51. Finally, terminal 64 is connected through a lead 66 to the "units" decade 50, to supply positive operating potential to the three counter stages.

Similarly, the negative pole of the voltage supply is connected by way of a terminal 67 and a lead 68 to a terminal 69 which is, in turn, connected through a lead 70 to the "hundreds" decade 52. Terminal 69 is further connected to a terminal 72 which is, in turn, connected through a lead 73 to the "tens" decade 51. Finally, terminal 72 is connected through a lead 74 to "units" decade stage 50, thereby completing the supply circuits for the counter.

Figure 2:
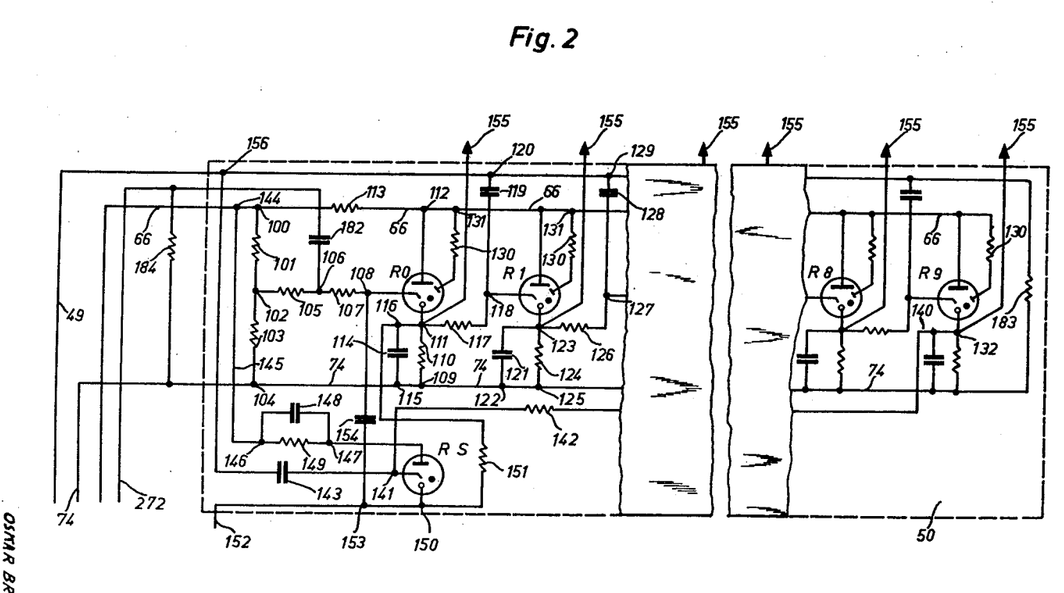
FIG. 2 is a more detailed circuit diagram of the "units" decade of the counter embodied in FIG. 1.

Referring to FIG. 2, there is shown in greater detail and by way of example a wiring diagram of the "units" decade 50 of the counter. As described, the counting pulse line 49, the positive or plus potential line 66 as well as the negative or minus potential line 74 are connected to the "units" decade in the manner shown in FIG. 1a. Connected to a terminal 100 on the plus line 66 is the end of a voltage divider resistor 101 the opposite end or terminal 102 of which is connected to a further voltage divider resistor 103, the latter being, in turn, connected to terminal 104 on the minus line 74. Further connected to the junction 102 of the voltage dividers 101 and 103 is a resistor 105 leading to a terminal 106 to which is connected a further resistor 107 leading to a terminal 108, the latter being connected directly to the ignition anode or control electrode of a cold cathode gas discharge counter tube R0 of the "units" decade 50. Connected between terminal 109 on the minus line 74 and the cathode terminal 111 of the tube R0 is a cathode resistor 110 being by-passed by a capacitor 114 having terminals 115 and 116.

In the example illustrated, the counting tubes are shown in the form of well-known cold cathode counting devices. A separate counting tube may be provided for each of the digits 0 to 9 of the decade stage, as shown in the drawing. Alternatively, a composite counting tube may be used having a common anode and a plurality of co-operating cathodes and control electrodes well known in the art. As is further well known and will be described hereafter, in a counter of this type the impressed counting pulses will result in an intermittent sequential discharge of the tubes, starting with the tube R0 and ending with the tube R9, the latter serving to produce a reset pulse for starting the next counting operation as well as to set the next or "tens" stage and so on, by a "carry" pulse in a manner well understood.

The anode of the tube R0 is connected to a terminal 112 on the plus line 66, while a series resistor 113 is connected between said terminal and the terminal 100, whereby said resistor is in series with all the anodes of the counting tubes for the purpose which will become evident from the following. Connected to the cathode terminal 111 of the tube R0 is a resistance 117 leading to a terminal 118 which is connected to the ignition anode of the tube R1 representing the next following digit of the decade. Connected between terminal 118 and a terminal 120 on the pulse line 49 is a coupling capacitor 119.

The cathode terminal 123 of tube R1 is connected, in a manner similar to that of the tube R0, to the minus line 74 by way of a cathode resistor 124 being shunted by a capacitor 121, the former having a terminal 125 and the latter having a terminal 122 on line 74. Further connected to the cathode terminal 123 is a resistance 126 leading to a terminal 127 which is connected to the ignition anode of the next following counting tube.

Since the following tubes and circuits are all identical, their showing in the drawing has been omitted for the sake of simplicity. Each of these tubes is connected to a circuit including resistors and capacitors in a manner similar to the tube R1. The terminal 127 is again connected to a terminal 129 on the pulse line 49 through a coupling capacitor 128, similar coupling connection being made for all of the succeeding counting tubes. Finally, the auxiliary anodes of the tubes are shown connected in a known manner to terminals 131 on the plus line 66 through voltage drop resistors 130.

Connected to the cathode terminal 132 of the last counting tube R9 by way of lead 140 and resistor 142 is the terminal 141 of the starting anode of a resetting tube RS the purpose of which is to produce (in a known manner) a reset pulse upon ignition or breakdown of the last counting tube R9, said pulse serving to reset the "units" stage for the starting of a new counting cycle as well as to supply a "carry" pulse to the next or "tens" decade by way of a terminal 153 and lead 152. Connected between the terminal 141 and a terminal 156 on the pulse line 49 is a capacitor 143. Further connected between terminal 144 on the plus line 66 and the anode of the resetting tube RS and by way of a lead 145 is a resistance 149 shunted by a capacitor 148 having terminals 146 and 147. The cathode of the resetting tube RS has a terminal 150 which is connected, on the one hand, to the "carry" lead 152 connected to the next decade stage and to the cathode terminal 111 of the tube R0 by way of a resistor 151, on the other hand. Connected between the terminal 153 and the ignition anode terminal 108 of the tube R0 is a capacitor 154. Furthermore, the cathode of each counting tube R0 to R9 is connected to an output lead 155, to produce consecutive or sequential counting pulses being applied to the coincidence networks or "and" circuits of the control units either directly or, preferably, by way of a distributor or programme selector for changing from one to another of a number of pre-arranged operating programmes. Further connected between lines 49 and 272, on the one hand, and line 74, on the other hand, are a pair of de-coupling resistors 183 and 184, respectively.

Figures 3, 4:
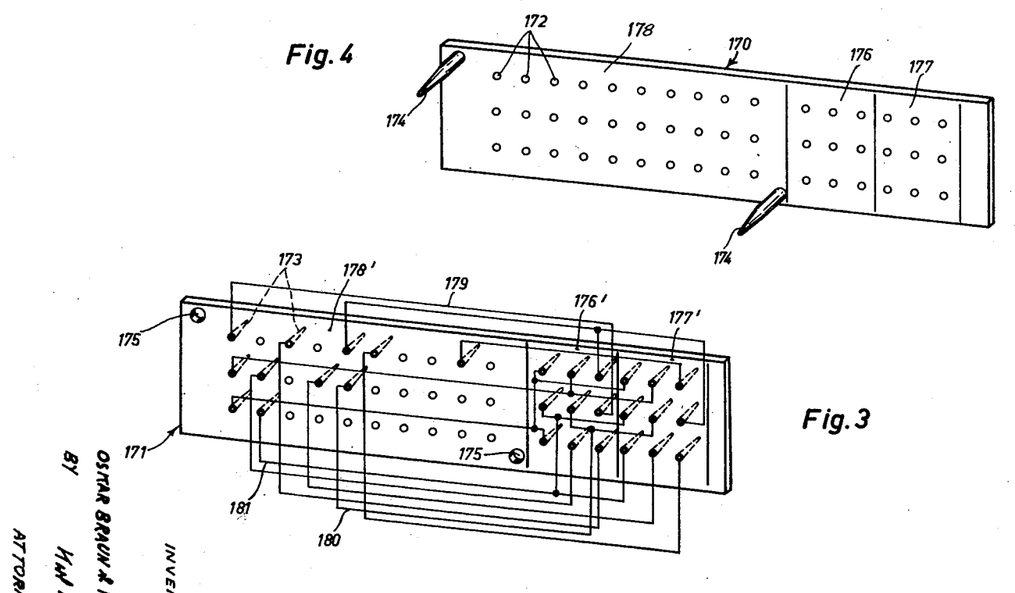
FIG. 3 shows one component part of a plug board type programming device suitable for use in connection with the invention.
FIG. 4 shows the cooperating part of the device.

FIGS. 3 and 4 illustrate, by way of example, one form of a distributor or programme selector comprising a pair of insulating supporting plates 170 and 171. Plate 170, FIG. 4, has a first section 178 which is provided with a number of contact sockets 172 arranged in three rows one underneath the other, each row comprising ten sockets which are connected to the respective cathode leads 155 of the ten counting tubes of the decades 50, 51 and 52, respectively. Section 178' of plate 171 is provided with a number of contact pins or plugs 173 corresponding to the number of sockets 172 of plate 170 and being arranged in such a manner that both plates 170 and 171 may be united with the pins 173 engaging the sockets 172. The plate 170 is further provided with a pair of guide pins or dowels 174 adapted to engage perforations 175 in the plate 171, whereby the plates may be combined in a predetermined relative positive only.

Two additional sections 176 and 177 of the plate 170 and 176' and 177' of plate 171 are provided with auxiliary sockets 172 and pins 173, respectively, for connection to a number of switching units 200 to 202 to be described presently, each section 176 and 177 again comprising three rows of sockets 172 and each section 176' and 177' comprising three rows of pins 173, in accordance with the example illustrated.

When using a counter comprising three decade stages, each counting number comprises three single pulses corresponding to the respective counter tubes being in the conducting or ionized state. Since the cathode leads 155 of the tubes are connected to the sockets 172 of the section 178 of the plate 170, as indicated in FIG. 1a, it is possible, by a suitable interconnection or wiring of the pins 173 of the plate 171 to apply predetermined groups of output potentials or pulses appearing at the cathodes of the counting tubes to the "set" and "unset" input circuits of the switching units 200 and 202 connected to the sections 176 and 177.

As an example, let it be assumed that the section 176 is connected to the "set" inputs and that the section 177 is connected to the "unset" inputs of the units 200 to 202 and let it be further assumed, as shown by FIG. 3, that it is desired to apply to the switching unit 200, connected to the upper rows of the sections 176 and 177, the 004th and the 008th counting pulse. Let it be further assumed that it is desired to apply to the switching unit 201, connected to the middle rows of the sections 176 and 177, the 140th and 144th pulse of the counter, and, finally, that it is desired to apply to the switching unit 202, connected to the lowermost rows of the sections 176 and 177, the 012th and 135th pulse of the electronic counter, in accordance with a specific operating programme selected by way of example and to be performed by the sewing machine.

In accordance with such a programme, the contact pins 173 of the section 178' of the plate 171 are connected with the pins 173 of the sections 176' and 177' of the same plate, in the manner specifically shown in FIG. 3. Thus, a connection 179 is shown to join the first pin of the uppermost row of section 178', which upon connection of the plates 170 and 171 is connected to the tube R0 of the "units" decade stage of the counter, with the last pin of the second row of the section 176', whereas the second pin of the latter row is connected through a lead 180 with the fifth contact pin of the second row of the section 178' which is connected to the fifth decade counter tube of the "tens" decade. Finally, the first pin of the second row of the section 176' is shown connected through a lead 181 with the second pin of the lowermost row of the section 178 which connects with the second counting tube of the "hundreds" decade, whereby, as desired, the 140th counting pulse will be applied to the input of the switching unit 201. Similar connections are made between the pins of sections 176', 177' and 178' in accordance with the remainder of programme selected and shown in the drawing. The sockets 172 of the sections 176 and 177 of the plate 170 are connected with the inputs of the switching units 200, 201, 202, to control the operation of the sewing machine in accordance with the selected programme.

The switching units 200 to 202 shown by way of example comprise a flip-flop or bistable multivibrator circuit being identical for each unit, whereby only the unit 200 need be described in detail, the remaining units being substantially identical to and operating in the same manner, as unit 200. The function and purpose of the switching unit 203 will be further described hereafter.

More specifically, the unit or trigger circuit 200 comprises, in the example shown, a pair of cold cathode gas discharge triodes R204 and R205. Connected to the cathode terminal of tube R204 is a relay B having its remaining end connected to a terminal 207 on the negative or cathode line 220 which is connected with the negative terminal 67 of the rectifier power supply. Connected to the control electrode or ignition anode of the tube R204 is a coincidence network or so-called "and" gate 208 being comprised of a parallel connection of a resistor 209 and a pair of diodes 210 and 211 all having a common output terminal 212 and three "set" input terminals or lines 213, 214 and 215, in the example shown, which are connected to the uppermost row of sockets 172 of the distributor section 176, FIG. 3, in the order from right to left.

The terminal 216 of the ignition anode of the tube 204 is connected through a resistor 217 to a terminal 218 on line 222 which is connected to the plus line 221 at terminal 223 leading to the plus terminal 33 of the power source. Further connected between the output terminal 212 of the "and" gate 208 and the ignition anode of the tube R204 is a voltage-sensitive resistor or varistor 219 the function of which will be described presently.

The second tube R205 of the trigger or flip-flop network is similarly preceded by a coincidence network or "and" gate 225 being comprised of a parallel connection of a resistor 226 and a pair of diodes 227 and 228 having a common output terminal 229 and three "unset" input terminals or lines 232, 233 and 234 which are connected to the sockets 172 of the upper row of section 177 of the distributor plate 170, FIG. 4. More specifically, input 232 of the "and" gate 225 is connected to the right-hand socket 172 of the section 177, input 233 is connected to the central socket of the section 177 and input 234 is connected to the left-hand socket of the upper row of section 177. Again, a varistor 230 is connected between terminal 231 of the ignition anode of the tube R205 and the output terminal 229 of the "and" or coincidence circuit 225.

Connected in parallel to the relay B is a rectifier 236 having a terminal 235 on minus line 220, while a by-pass capacitor 238 is connected between the cathode terminal 206 of tube R204 and a terminal 237 on line 220.

The switching units 201 and 202 are constructed substantially similarly to the unit 200. Thus, an "and" gate 240 is again connected to the "set" input or circuit of the unit 201 and a similar "and" gate 241 is connected to the "unset" input of the unit. Inputs 242, 243 and 244 of the "and" gate are connected to the central row of the sockets of the section 176 of the distributor plate 170, FIG. 4, in the order from right to left, while the inputs 245, 246 and 247 of the "and" gate 241 are connected in the same order to the central row of the sockets of the section 177 of plate 170. In the same manner, the input or "set" circuit of the switching unit 202 is connected via an "and" gate 250 having inputs 252, 253 and 254 connected with the lowermost row of sockets of the section 176 in the order from right to left, while the cooperating input or "unset" circuit of the same unit is similarly connected via an "and" gate 251 having inputs 255, 256 and 257 to the corresponding sockets of the lowermost row of the section 177 of the plate 170.

The switching unit 203 serves to indicate the zero position of the counter and for this purpose comprises a single gas discharge tube only being preceded by an "and" gate 260 having inputs 261, 262 and 263 each connected to the cathode leads 155 of the first tube R0 of each decade stage of the counter. Connected in the cathode circuit of the unit 203 is a relay A, while similar relays C and D are connected in the cathode circuits of the units 201 and 202, respectively.

The switching units 200, 201 and 202 constitute bistable multivibrators or trigger circuits and serve to control the On and Off positions of the relays B, C and D which, in turn, control the devices to be automatically operated during a complete control cycle or programme, such as the connection and disconnection of the stitch-forming tools, control of the stitching direction, of a cutting knife, or any other desired number of auxiliary devices of the sewing or the like machine. As pointed out, in the operation of the circuits 200, 201 and 202, the input of one of the tubes represents the "set" circuit and the input of the other tube represents the "unset" circuit of the multivibrator or flip-flop network, whereby to energize and de-energize the relays B, C and D at predetermined instants during an operating cycle as determined by the connection of the contact pins 173 of the distributor or programme selector constituting a permanent memory or data storage device. As will be understood, any other type of bistable or trigger circuit or equivalent device capable of being set and unset, through suitable "and" gates or circuits may be used for the control of the relays B, C and D, in accordance with the broader spirit and purview of the invention.

Connected to the terminal 270 on the plus line 221 is the open-circuit contact $f1$ of a further relay F having a cooperating stationary contact connected to a terminal 271. The latter is, in turn, connected by way of reset line 272, capacitor 182, FIG. 2, terminal 106 and resistor 107 to the terminal 108 of the starting anode of the tube R0 of the "units" decade stage. Similar connections are provided from the reset line 272 to the corresponding starting anodes of the tubes R0 of the "tens" and "hundreds" decade stages.

In order to initially place the system in operative condition, there is further provided a manual control switch 185 connected across relay contacts $f1$. Switch 185 may be operated by a knee control lever which at the same time may serve to raise and lower the presser foot of the sewing machine, in a manner well known.

Leading from terminal 271 is a further reset line 273 which is connected to the terminal 231 of the starting anode of tube R205, similar reset connections being provided to the starting anodes of the respective tubes of the switch units 201 and 202 by way of leads 275 and 277 connected to terminals 274 and 276 on line 273.

Further connected to branch terminal 3 of the A.C. power source by way of a lead 280, fuse 281 and the movable contact 282 of a double-pole switch 283, is the input terminal 284 of a further rectifier 285 having a cooperating input terminal 289 connected to the other branch terminal 13 of the power source through lead 286, fuse 287 and movable contact 288 of the switch 283. Connected to the plus output terminal 290 of the rectifier 285, by way of a lead 292 and terminals 293, 294, 295, 296, 297 and 298, is one end of the relay winding F, while the negative output terminal 291 of the rectifier 285 is connected, by way of a lead 299 and terminals 300, 301, 302, 303, and 304 to the open circuit contact e2.

Connected between terminals 293 and 300 is the winding of a control magnet H in series with a contact e3 of the relay E. The magnet H may serve to operate the starting lever or the like control of the sewing machine. Connected to the terminal 294 is one end of the winding of a further control magnet K which may serve to operate the stitch control of the sewing machine 48, to temporarily change from forward to reverse stitching. The opposite end of the relay winding K is connected to a fixed contact shown to cooperate with a pair of open circuit contacts b2 and c3 of relays B and C and being connected to terminals 301 and 302 on line 299, respectively. Connected to terminal 295 is one end of a further magnet winding L whose opposite end is connected to a fixed contact cooperating with a movable contact d1 of the relay D and being connected to terminal 303 on line 299. Control magnet L may serve to operate a cutting knife, thread extractor or any other control device of the sewing machine.

Connected between terminals 296 and 297 on line 292 is a series circuit comprising a capacitor 305, a fixed resistor 306, the closed-circuit operated contact c1 of the relay C of the switching unit 201, a variable resistor 307 and the relay E. Connected to terminal 298 on line 292 is a further circuit including a capacitor 308, a fixed resistor 309, the closed-circuit operated contact e1 of the relay E and the winding of the relay F.

The operation of the system shown is described in the following. Upon closing of the power switches 7 and 283, the system is placed in operative condition. Prior to the starting of a sewing operation, closing of the relay contact $f_1$ upon termination of a preceding operation, or closing of the switch 135 when initially placing the system into operation, will result in a positive reset pulse to be applied from the positive terminal 33 of the D.C. power source to the control electrodes of the tubes R0 of each of the decade stages 50, 51 and 52, whereby the counter will be set to the number 000 with the tubes R0 of each of the decade stages conducting as indicated by the luminous gas discharge. After the tube R0 has been ignited, a current flow will be established traced as follows:

I. Negative line 74, cathode resistor 110, cathode-anode path of R0, series resistor 113 and positive line 66.

This current causes a voltage drop across the resistor 110, resulting in a charging of the capacitor 114 and in the application of a positive bias to the starting anode of tube R1 by way of resistor 117 and terminal 118.

If now the sewing machine 48 is set into operation, a counting pulse is produced by the interrupter 46 during each revolution or stitching operation. As a consequence, a positive pulse is applied by way of the pulse line 49 and capacitor 119 to the starting anode of the counting tube R1. This raises the potential of the latter above the ignition potential, thus causing the tube to fire and conduct. Since, at the instant of initiation of the ignition of the tube R1, the capacitor 121 is uncharged, resistor 124 is short-circuited, whereby to momentarily establish a high current through the series resistor 113 resulting in a relatively large voltage drop across the latter compared with normal operating conditions. As a consequence, the operating voltage of the tube R0 is reduced below the critical voltage necessary to maintain a sustained ionic discharge, thus causing the extinguishment of the tube. Since tube R1 is now conducting, a positive bias potential is applied from the cathode terminal 123 to the starting anode of the next counting tube by way of resistor 126 and terminal 127, in substantially the same manner as described in reference to tube R1. The discharge is thus transferred to the next tube, while extinguishing the preceding tube, and so on by the subsequent counting pulses applied through line 49, until reaching the last tube R9 of the "units" decade.

When tube R9 is ignited, a positive potential will be applied by way of resistor 142 from the cathode of tube R9 to the starting anode or terminal 141 of an auxiliary or reset tube RS. Upon the arrival of the next counting pulse on line 49, the latter being applied through terminal 156 and capacitor 143 to the starting anode of tube RS, causes the tube to fire and to establish a current flow traced as follows:

II. Terminal 144 on plus line 66, capacitor 148, anode-cathode path of tube RS, terminal 150, resistor 151, capacitor 114 and terminal 115 on negative line 74.

As a consequencem, a voltage drop is set up across resistor 151 having a temporal course determined by the charging of the capacitors 114 and 148. The potential or reset pulse at the cathode or terminal 150 of the tube RS is applied, on the one hand, to the starting anode or terminal 108 of tube R0 through a capacitor 154, and to the starting anode of the tube R0 of the next or "tens" decade 51 by way of "carry" line 152.

Normally, the ignition anode of the tube R0 is biased by the voltage divider 101—103 to such a potential that with the arrival of a pulse from the cathode terminal 150 of the tube RS the tube R0 will fire instantly, whereby furthermore the voltage drop across the resistor 110 causes the operating voltage of the tube RS applied through the resistor 151 to be reduced and to result in the extinguishment of he tube RS. As soon as tube R0 has been ignited, the tube R9 is also extinguished due to the effect of the series resistor 113, whereby, with the arrival of the tenth counting pulse, the tube R0 of the "units" decade and the tube R1 of the "tens" decade will be conducting. The following counting pulses again cause a progressive operation or transfer of the discharge to the next tube and extinguishment of the preceding tube of the "units" decade 50 in the manner described. After the 99th counting pulse and upon arrival of the 100th pulse the tube R0 of the "hundreds" decade will be extinguished and tube R1 ignited, in a manner readily understood from the foregoing.

As pointed out, the coincidence circuit or "and" gate 203 preceding the "set" input of the switching unit 200 comprises the resistor 209 and diodes 210 and 211, whereby an effective output potential at the terminal 212 will occur only if all the respective tubes of the counter are conducting, that is, tube R4 of the "units" decade 50, tube R0 of the "tens" decade 51 and tube R0 of the "hundreds" decade 52, according to the example mentioned. The potential at point 212 is normally insufficient to start the discharge of the tube 204, whereby to make it necessary to raise the potential at point 216 of the starting anode beyond the critical or ignition potential of the tube. This is effected by the voltage divider circuit comprising the resistor 217, the varistor 219, resistor 209 as well as the cathode resistors of the respective tubes of the counter stages. With the tubes in a non-conducting condition a relatively high voltage occurs between the ends of the varistor 219, whereby its resistance is of a relatively low value. As a consequence, the potential at point 216 is relatively low and insufficient to ignite the tube 204. If now the potential of the cathodes of all the three counting tubes appears at the point 212, the voltage across the potential divider comprising resistance 217 and varistor 219 is reduced, resulting in an increase of the resistance of the varistor. As a result, the potential at point 216 is displaced in the positive direction so as to exceed the ignition potential of the tube 204 and to result in the ignition of the latter and the energization of the relay B. If the output potentials were derived from the anodes of the counting tubes, or equivalent electronic counters, with suitable load resistors being mounted between said anodes and the plus line 66, the varistor 219 may be dispensed with by so designing the circuit parameters that normally the potential at point 216 is below the ignition potential and that with input pulses being applied to all of the inputs 213, 214 and 215 of the "and" gate, the potential is raised above the ignition point, to result in the breakdown or ignition of the tubes, the same applies to the other tubes and the remaining switching devices.

This condition will persist until the next preselected pulse is applied to the "unset" inputs 232, 233, 234 of the switching unit 200. This will ocur, in accordance with the example mentioned, after the eighth counting pulse being applied to the ignition anode of the tube 205 by way of the "and" circuit 225, in substantially the same manner as described and resulting in the ignition of the tube 205. Conduction of the latter results in the operating voltage of the tube 204 being reduced to an extent to cause the same to be extinguished, causing, in turn, the de-energization of the relay B. As a result, the switching operation of the unit 200 is completed. The rectifier 236 connected in parallel to the relay winding B serves to suppress undesirable oscillations by the capacitor 238 and the inductance of the relay winding forming an oscillatory circuit.

In place of the gas discharge tube trigger or flip-flop circuit constituting the switching unit, any equivalent bistable trigger or the like device or network capable of connection and disconnection by "set" and "unset" potentials or pulses may be used for the purpose of the invention, as will be understood.

Energization of the relay B causes closing of the contact $b_2$, whereby to establish the energizing circuit of the magnet K of the stitch controller being traced as follows:

III. Positive terminal 290, line 292, terminal 293, 294, magnet winding K, contact $b_2$, terminals 301, 300, lead 299, and minus terminal 291.

The magnet K may serve to effect, in a known manner, a reversal of the stitch controller, to change from forward to reverse stitching, whereby the machine, in the example mentioned, sews the fifth to the eighth stitch in the reverse direction. Subsequently, the contact $b_2$ is reopened, resulting in the interruption of the circuit III and return of the stitch control to the position for forward stitching. Simultaneously with the energization of relay B, closed-circuit contact $b_1$ is opened, resulting in the interruption of the switching unit 203.

As previously mentioned, the inputs 261-263 of the coincidence circuit or "and" gate 260 of the switching unit 203 are connected directly to the cathode terminals 111 of the tubes R0 of the three decade stages 50, 51 and 52. As a consequence, as soon as all three tubes are ignited, that is, when the counter is in zero position, the tube of the switching device 203 is ignited, resulting in the response of the relay A. This causes closing of contact $a_1$ and lighting of the pilot lamp 21 by establishing a circuit traced as follows:

IV. Secondary winding 19 of the transformer 10, lead 26, contact $a_1$, signal lamp 21, lead 27 and winding 19.

Upon opening of the contact $b_1$, de-energization of the relay A results in reopening of the contact $a_1$ and extinguishment of the lamp 21. The latter will be lighted again if the tubes R0 of each of the decade stages are again ignited simultaneously or the counter is in the zero position, in the manner described.

Due to the design or connection of the distributor, according to the example mentioned, the twelfth counting pulse is applied to the "set" inputs 252-254 of the switching unit 202. As the result, relay D is energized and closes its contact $d_1$ whereby to establish a circuit for the cutting knife coupling magnet L being traced as follows:

V. Positive terminal 290, lead 292, terminals 293, 294, 295, magnet winding L, contact $d_1$, terminals 303, 302, 301, 300, lead 299 and negative terminal 291.

As the result, the cutting knife or the like device will be operated, whereby to cut the material simultaneously during the sewing operation, such as during the sewing of a pocket or for any other purpose.

This condition will persist until the 135th pulse is applied to the "unset" input 255-257 of the "and" network 251 of the switching unit 202, whereby to de-energize the relay D and to reopen contact $d_1$ resulting in the interruption of the circuit V. This causes the cutting knife or the like to return to its rest position, such as by the action of a return spring.

The sewing machine 48 continues to operate until the 140th pulse, according to the example mentioned, is applied to the "set" input 242-244 of the network 240 of the switching unit 201, whereby to energize the relay C, resulting in the closing of contacts $c2$ and $c3$ and the opening of the contact $c1$, respectively. Closing of contact $c2$ results in the charging of the capacitor 305 through a circuit traced as follows:

VI. Plus terminal 290, lead 292, terminals 293, 294, 295, 296, capacitor 305, resistor 306, contact $c2$, terminals 304, 303, 302, 301, 300, lead 299 and negative terminal 291.

Simultaneously with the energization of the relay C contact $c3$ is closed, whereby to again operate the stitch controller by establishing the circuit III through contact $c3$. This again causes a reversal of the stitching direction, whereby the machine will now sew four stitches in the reverse direction, that is, until the arrival of the 144th counting pulse exciting the "unset" inputs 245-247 of the network 241. This results in the de-energization of the relay C, whereby to open the contact $c3$ and to disconnect the stitch controller magnet K. Furthermore, the contact $c2$ will be opened and the contacts $c1$ reclosed, whereby to cause the response of the relay E by the establishment of a discharge circuit of the capacitor 305 being traced as follows:

VII. Capacitor 305, resistor 306, contact $c1$, variable resistor 307, relay winding E, terminal 297, terminal 296 and capacitor 305.

Response of the relay E results in the closing of contact $e3$ and energization of the magnet H by a circuit raced as follows:

VIII. Plus terminal 290, lead 292, terminal 293, magnet winding H, contact $e3$, terminal 300, lead 299, and negative terminal 291.

The magnet H may serve in a known manner to effect the stoppage of the sewing machine by controlling the starting lever or energizing a magnetic clutch.

Simultaneously with the energization of the relay E contact e2 is closed to result in a charging of the capacitor 308 by a circuit traced as follows:

IX. Plus terminal 290, lead 292, terminals 293, 294, 295, 296, 297, 298, capacitor 308, resistor 309, contact e2, terminals 304, 303, 302, 301, 300, lead 299 and negative terminal 291.

As soon as the capacitor 305 has been discharged through the circuit VII and the relay E, the latter is de-energized, whereby to open the contact e3 and the circuit VIII. The brief excitation of the magnet H may be adjusted by variation of the resistor 307.

At the same time the contact e2 is reopened, thus interrupting the charging circuit IX of the capacitor 308. Subsequently the contact e1 is closed, resulting in a discharge of the capacitor 308 through a circuit containing the relay F and traced as follows:

X. Capacitor 308, resistor 309, contact e1, relay F, terminal 298 and capacitor 308.

As a result, relay F closes its contact $f_1$, whereby to apply a positive reset pulse from the plus terminal 30 of the rectifier 18 to the reset line 272 and to cause the R0 tubes of the decade stages to be returned to the zero position in the manner described. As a further consequence, pulses are applied to the inputs 261, 262 and 263 of the network 260 of the switching unit 203, resulting in the energization of the relay A and lighting of the pilot lamp 21, whereby to indicate the zero or starting condition of the system.

At the same time a reset pulse is applied, upon closing of the contact $f_1$ and by way of reset line 273, and terminals 276, 274 and 231 to the starting anode of the tube R205 of the switching unit 200 and similarly to the corresponding starting anodes of the corresponding tubes of the switching units 201 and 202, whereby to return the entire system to starting condition.

The same operating programme may then be repeated or a different programme carried out by the use of a different prewired contact plate 171, FIG. 3.

In the foregoing, the invention has been described with reference to a specific illustrative system. It will be evident, however, that numerous variations and modifications, as well as the substitution of equivalent parts or circuits, may be made without departing from the broader scope and spirit of the invention as set forth by the appended claims. The specification and drawings are accordingly to be regarded in an illustrative rather than in a restrictive sense.

We claim:

1. An automatic control system for machines having a plurality of devices to be operated during a predetermined operating cycle of said machine, said system comprising an electric pulse generator controlled by said machine and adapted to produce a series of electric counting pulses, each pulse representing a predetermined elemental movement of said machine, an electronic pulse counter connected to said generator and having a plurality of decade counting stages adapted to produce groups of simultaneous "units," "tens," "hundreds" etc. signal pulses representing successive counting numbers, a plurality of trigger circuits each arranged to control one of said devices and having "set" and "unset" input circuits for connecting and disconnecting said devices, coincidence networks each having an output circuit connected to one of said "set" and "unset" circuits and a group of input circuits corresponding to the number of decade stages of said counter, and circuit connections to apply predetermined groups of signal pulses from said counter to each group of input circuits of said coincidence circuits, whereby to set and unset said trigger circuits at predetermined instants and to cause operation of the respective devices during corresponding fractional periods within an operating cycle of said machine.

2. An automatic control system for sewing and the like machines having a plurality of devices to be controlled during a predetermined operating cycle of a machine, said system comprising an electric pulse generator controlled by said machine and adapted to produce a series of electric counting pulses, each pulse representing a predetermined elemental movement of said machine, an electronic pulse counter connected to said generator and having a plurality of decade counting stages adapted to produce groups of simultaneous "units," "tens," "hundred" etc. signal pulses representing successive counting numbers, a plurality of bistable trigger circuits each having a pair of branch circuits and "set" and "unset" circuits to transfer current flow from one to the other branch circuit and vice versa, respectively, a plurality of relays each connected in one of the branch circuits of said trigger circuits and arranged to control one of said devices, "and" gate circuits having a group of input circuits corresponding to the number of decade stages of said counter and an output circuit connected to one of said "set" and "unset" circuits, and circuit connections to apply predetermined groups of signal pulses from said counter to each group of input circuits of said gate circuits, whereby to set and unset said trigger circuits at predetermined instants and to cause operation of the associated operating devices during corresponding fractional periods within an operating cycle of said machine.

3. A control system as claimed in claim 2 including exchangeable multiple-connector means for selectively interconnecting the outputs of said counter with said "and" gate circuits according to different operating programmes to be performed by said machine.

4. In a control system as claimed in claim 3, said last means comprising a first member carrying a plurality of first terminals connected partly to the outputs of said counter and partly to the inputs of said "and" circuits, and a cooperating exchangeable member having a plurality of contact terminals adapted to engage corresponding ones of said first terminals, and circuit connections interconnecting predetermined ones of said last-mentioned terminals in accordance with a predetermined operating programme to be performed by said machine.

5. In an automatic control system for sewing and the like machine having a plurality of operating devices to be controlled during a predetermined operating cycle of a machine, said system comprising an electric pulse generator controlled by said machine and adapted to produce a series of electric counting pulses, each pulse representing a predetermined elemental movement of said machine, an electronic pulse counter connected to said generator and having a plurality of counting stages each comprised of a decade of counting tubes and means to consecutively transfer conduction of one tube to the next tube by the counting pulses and including "reset" and "carry" pulse transfer means between one and the next decade stage, load resistors connected to each of said tubes to produce groups of simultaneous "units," "tens," "hundreds" etc. signal pulses representing successive counting numbers, a plurality of bi-stable trigger circuits each having a pair of branch circuits and "set" and "unset" circuits to transfer current flow from one to the other branch circuit and vice versa, respectively, a plurality of relays each connected in one of the branch circuits of said trigger circuits and arranged to control one of said devices, "and" gate circuits each having a group of input circuits, corresponding to the number of decade counting stages and an output circuit connected to one of said "set" and "unset" circuits, and exchangeable multiple-circuit connector means between said load resistors and each group of input circuits of said "and" circuits, whereby to set and unset said trigger circuits at predetermined instants and to cause operation of each of said devices during corresponding fractionable selectable periods within an operating cycle of said machine.

6. In a control system as claimed in claim 5, said connector means comprising a first member carrying a plurality of first contact terminals connected partly to the outputs of said counter and partly to the inputs of said "and" circuits, and a cooperating member having a plurality of second contact terminals adapted to exchangeably engage corresponding ones of said first terminals in the assembled position of said members, and circuit connections interconnecting predetermined ones of said last-mentioned terminals in accordance with a predetermined operating programme to be performed by said machine.

7. A control system as claimed in claim 5, including a capacitor and means to charge the same during the operation of one of said operating devices, means to subsequently discharge said capacitor, and means to effect the stoppage of said machine by the capacitor discharge current.

8. A control system as claimed in claim 7 including further means controlled by said last means to reset said counter to its zero position upon stoppage of said machine.

References Cited in the file of this patent
UNITED STATES PATENTS

| | | |
|---|---|---|
| 2,375,413 | Guenther | May 8, 1945 |
| 2,519,184 | Grosdoff | Aug. 15, 1950 |
| 2,595,519 | Geohegan | May 6, 1952 |
| 2,705,466 | Sargrove et al. | Apr. 5, 1955 |
| 2,803,407 | Berger | Aug. 20, 1957 |
| 2,871,399 | Scuitto | Jan. 27, 1959 |
| 2,970,763 | Freeman | Feb. 7, 1961 |
| 2,988,275 | Thomason | June 13, 1961 |

OTHER REFERENCES

Tele-Tech & Electronic Industries, August 1953 (pp. 82, 83, 210–212), "A Preset Counter for Time and Quantity Measurements," by T. H. Thomason.

Electronics, October 1955 (pp. 128–129), "Counting Labels With Ferroresonant Rings," by Eric Swarthe et al.